United States Patent [19]
Huss et al.

[11] Patent Number: 5,303,937
[45] Date of Patent: Apr. 19, 1994

[54] SEAL HAVING A METALLIC INSERT

[75] Inventors: Howard D. Huss, Westmoreland City; William G. Greenaway, North Huntington; Lawrence R. Streitman, Pittsburgh, all of Pa.

[73] Assignee: Westinghouse Air Brake Company, Wilmerding, Pa.

[21] Appl. No.: 1,818

[22] Filed: Jan. 8, 1993

Related U.S. Application Data

[62] Division of Ser. No. 739,121, Jul. 31, 1991, Pat. No. 5,213,749.

[51] Int. Cl.⁵ .............................................. F16J 15/12
[52] U.S. Cl. ................................. 277/215; 277/235 R; 251/358
[58] Field of Search ............... 277/179, 215, 235 R; 251/358, 364; 137/384

[56] References Cited

U.S. PATENT DOCUMENTS

| | | |
|---|---|---|
| 2,145,597 | 1/1939 | Hait .............................. 277/235 R X |
| 2,637,606 | 5/1953 | Pielop, Jr. ................... 277/235 R X |
| 2,670,755 | 3/1954 | Kendrick ....................... 251/363 X |
| 2,958,561 | 11/1960 | May . |
| 3,504,950 | 4/1970 | McClure . |
| 3,622,427 | 11/1971 | Kelly ........................... 277/235 R X |
| 4,303,223 | 12/1981 | Whisenhunt et al. ............ 251/358 X |
| 4,817,914 | 4/1989 | Pick et al. ...................... 251/358 X |
| 4,913,951 | 4/1990 | Pitolaj ........................ 277/235 R X |
| 5,020,207 | 6/1991 | Minoda et al. . |
| 5,095,805 | 3/1992 | Boehm et al. ................... 251/358 X |

FOREIGN PATENT DOCUMENTS

| | | | |
|---|---|---|---|
| 1315216 | 12/1962 | France ................................. 251/358 |
| 200769 | 7/1923 | United Kingdom ............ 277/235 R |

Primary Examiner—William A. Cuchlinski, Jr.
Assistant Examiner—Scott W. Cummings
Attorney, Agent, or Firm—J. O. Ray, Jr.

[57] ABSTRACT

A method of forming a rubber seal containing a metal insert where a transfer mold having a cavity is provided with a post and a plurality of upwardly extending arcuated bosses on the base of the cavity. A metallic insert is disposed on the bosses and a flowable rubber material forced into the mold cavity and envelopes the metallic insert to form the rubber ring seal. The rubber seal produced has a plurality of spaced, aligned arcuate grooves in a flat planar surface of the base extending inwardly towards the embedded metallic insert.

9 Claims, 3 Drawing Sheets

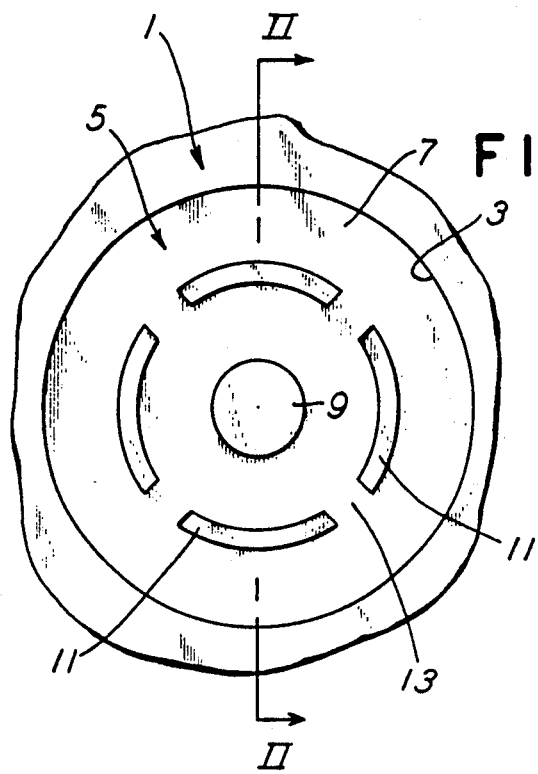
FIG. 1
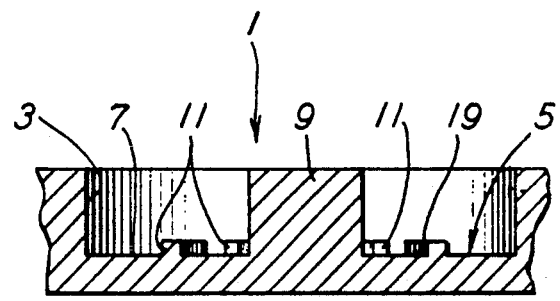
FIG. 2
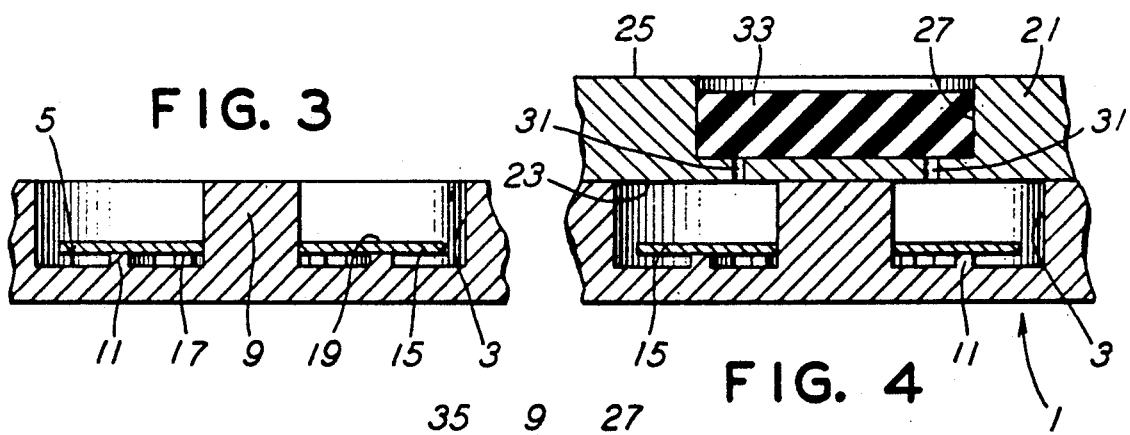
FIG. 3
FIG. 4
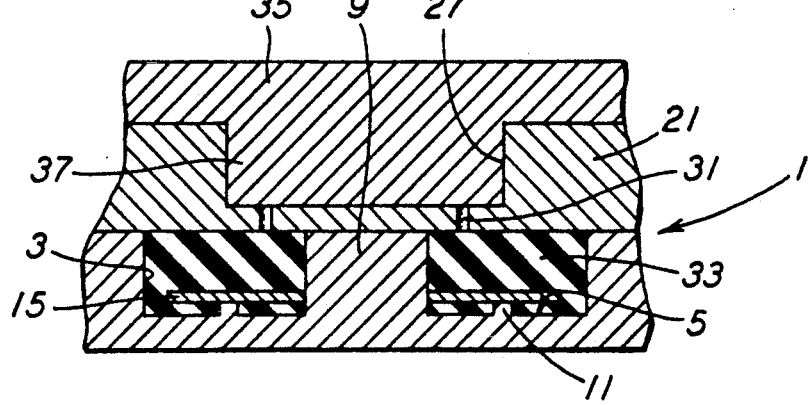
FIG. 5

SEAL HAVING A METALLIC INSERT

This is a division, of application Ser. No. 07/739,121, filed Jul. 31, 1991 now U.S. Pat. No. 5,213,749.

Field of the Invention

The present invention relates to a method of forming a seal that is in the form of a rubber ring having a metallic insert embedded therein and to a rubber seal so produced.

Background of the Invention

The use of seals formed from a rubber composition is made in many different sealing applications. In some such applications, the seal, for added stability and strength is formed from a rubber composition that has a metallic insert, such as a metal ring, embedded in the rubber.

In various railway brake apparatus, for example, fluid brake apparatus as described in U.S. Pat. No. 2,958,561, issued Nov. 1, 1960 to Harry C. May, and in U.S. Pat. No. 3,504,950, issued Apr. 7, 1970, to Glenn C. McClure, both of which were assigned to the assignee of the present invention, the use of rubber seals in the form of a ring are used, the seals having metallic inserts embedded therein. It is important that such ring seals have a size and strength within specific limits, and that such seals retain their predetermined configuration when in use so as to prevent leakage between the components between which the seals are positioned.

Such fluid brake apparatus for railway vehicles (as described in the above patents) have been designated in the industry as the 26 Brake Valve and has been in use for a period of time. At periodic intervals, namely within any twenty-four month period of operation, the brake valve is removed from the equipment and is completely dismantled, with various parts of the brake valve cleaned, inspected, lubricated, reassembled and tested. New rubber parts, such as seals, as specified in maintenance operation, are inserted at this time.

A prior process for forming a seal in the form of a rubber ring having a metallic insert embedded in the rubber ring used a compression molding technique. In the compression molding technique, a rubber batch was first mixed, calendared to a desired thickness and rubber rings punched out of the rubber composition. A compression mold was provided having a mold cavity base with upstanding spaced pins around a post in the mold cavity. A first punched rubber ring was disposed about the post on the pins and the metal insert was then disposed about the post and superimposed on the first punched rubber ring. A second punched rubber ring was then superimposed on the metal insert. The compression mold was then closed and the three piece unit was subjected to compression molding and curing to form the seal. The compression molding technique had problems in that the results were not readily reproducible and shifting or mis-alignment of the metal insert would occur during molding. For example, if one of the pins wore slightly more than others, a non-uniform thickness of rubber layer on one side of the metal insert relative to the other side could occur or a wavy or non-flat surface could result on the seal. It was often necessary to lap or smooth the top and/or bottom surface of a seal to a flat surface after compression molding. While such lapping provided a smooth flat surface, when the seal was used in a component a non-flat configuration of the top and/or bottom could result, which would result in a leaky seal. Often such a problem would not appear during examination of the seal but would appear only after the seal was put into use, causing other problems.

Summary of the Invention

A seal in the form of a rubber ring having a metallic insert embedded therein is formed by a method using a transfer mold of a particular configuration. A transfer mold has a cavity with a base, the base having a central post extending upwardly from the surface of the base and a plurality of arcuate-shaped spaced bosses extending upwardly from the base about the post, along a circle drawn concentrically with the post. A metallic insert, such as a flat brass circlet is disposed in the mold cavity about the post and rests on the spaced arcuate raised bosses such that the metallic insert is disposed in the mold spaced from the surface of the mold base.

A flowable rubber material is forced into the mold cavity after closing the top of the mold cavity with a cover, such that the flowable rubber composition fills the cavity and envelopes the metallic insert to form a rubber ring seal having the metallic insert embedded therein. The rubber composition of the ring seal is then cured and the seal removed from the mold cavity.

The rubber seal of the present invention has a rubber ring with a base having a flat support surface, a top wall, and inner and outer side walls, the outer side wall preferably tapered, with a metal insert embedded in the rubber ring at a location closer to the base than to the top wall. The flat surface of the base has a plurality of arcuate grooves therein extending inwardly towards the embedded metallic insert.

Objects of the Invention

It is an object of the present invention to provide a method of forming a rubber ring seal having a metallic insert embedded therein which produces quality seals with exact dimensions.

It is another object of the present invention to provide a method for forming a rubber ring seal having a metallic insert therein which is faster and produces a more consistent product than a compression molding technique.

It is still another object of the present invention to provide a method for forming a rubber ring seal having metallic insert therein in a manner that does not require smoothing or lapping of the flat surface of the seal.

It is yet another object of the present invention to provide a method for forming a rubber ring seal having a metallic insert therein which is more economical and efficient than prior art compression molding techniques for forming such seals.

It is a further object of the present invention to provide a rubber seal containing a metallic insert which does not require smoothing or lapping of the flat seal surface prior to use.

It is an additional object of the present invention to provide a rubber seal containing a metallic insert that has flat planar surfaces upon molding with the metallic insert retained therein in a coplanar relationship to said surfaces.

In addition to the several objects and advantages of the method of forming a rubber seal containing a metallic insert and the ring seal described above, various other objects and advantages of the present invention will become more readily apparent to those persons skilled in the art from the following detailed description of the invention, particularly when such description is taken in conjunction with the attached drawing FIGURES and with the appended claims.

Brief Description of the Drawings

FIG. 1 is a plan view of a transfer mold cavity used in the present method;

FIG. 2 is a cross-sectional view taken along lines II—II of a transfer mold cavity of FIG. 1 used in the method of the present invention;

FIG. 3 is a view similar to FIG. 1 showing a metallic insert resting on raised arcuate bosses in a transfer mold cavity;

FIG. 4 is a view similar to FIG. 3 showing a cover placed over the mold cavity and a flowable rubber composition ready for transfer to the mold cavity;

FIG. 5 is a view similar to FIG. 4 showing the flowable rubber composition transferred to the mold cavity and ready for curing;

Detailed Description

Figure 6:
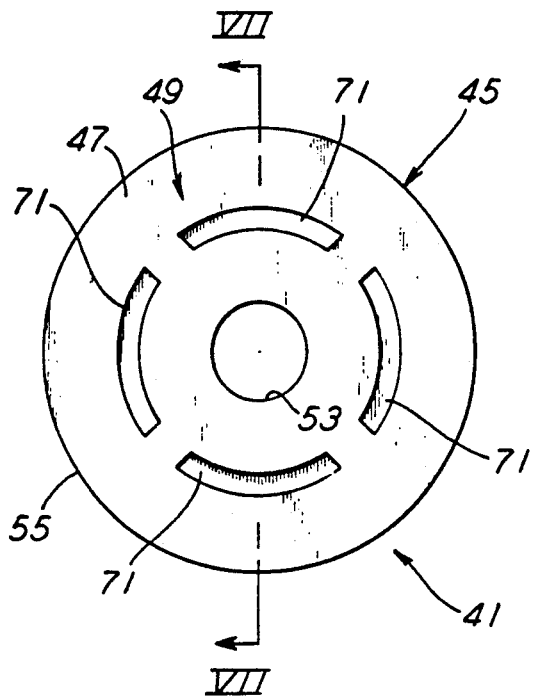
FIG. 6 is a bottom plan view of a seal of the present invention.

Referring now to FIGS. 1-5, the present method of forming a seal in the form of a rubber ring having a metallic insert embedded therein is schematically illustrated. A transfer mold having a transfer mold cavity portion 1 is shown in FIG. 1, the transfer mold cavity 1 having a side wall 3 and a base 5, the base 5 having a surface 7. The base 5 has a central post 9 extending upwardly therefrom and a plurality of spaced arcuate bosses 11 extending upwardly therefrom about the post 9. The spaced arcuate bosses 11 are preferably midway between the side wall 3 of the mold cavity 1 and the post 9 and lie along a circle concentric with the post 9. As best seen in FIG. 1, the spaced arcuate bosses have openings 13 therebetween. Also, the spaced arcuate bosses are preferably of a length so as to extend a major portion of the circumference of a circle containing the arcuate bosses. A metallic insert 15, in the form of a flat circlet, is disposed in the mold cavity 1 about the central post 9, such that the bottom surface 17 of the metallic insert 15 rests on the upper surfaces 19 of the spaced arcuate bosses 11, as shown in FIG. 3.

A cover 21 for the mold cavity 1 is provided, as illustrated in FIG. 4, the cover formed as a transfer pot having a bottom wall 23, which cooperates with the mold cavity wall 3, and a top wall 25. A pot section or recess 27 for a flowable rubber composition is formed in the top wall 25, the recess having a floor 29, with a plurality of passageways 31 communicating between the recess 27 and the mold cavity 1. A flowable rubber composition 33 is placed in the recess 27 of the cover 21 for transfer to the mold cavity 1. A plunger 35 is then used to force or transfer the flowable rubber composition from the recess 27 in cover 21 through the passageways 31 into the mold cavity 1, the plunger having an extension 37, such as a cylindrical extension, that mates in the recess 27. Upon entry into the mold cavity the flowable rubber composition 33 envelopes the metallic insert 15 and is formed into a rubber ring having the metallic insert 15 embedded therein, as shown in FIG. 5. The metallic ring is then cured at the desired temperature and for the desired time period to form a seal which is then removed from the mold cavity 1.

The particular curing temperatures and times will vary dependent upon the rubber composition used to form the seal but usually will be on the order of a temperature between about 300° to 375° F. and a time of between 4-15 minutes. Most preferably, the rubber seal will be cured at a temperature of about 350° F. for a period of 10 minutes. The temperature and time of curing should be that sufficient to cure the rubber to an extent of at least 90 percent curing of the rubber.

Figure 8:
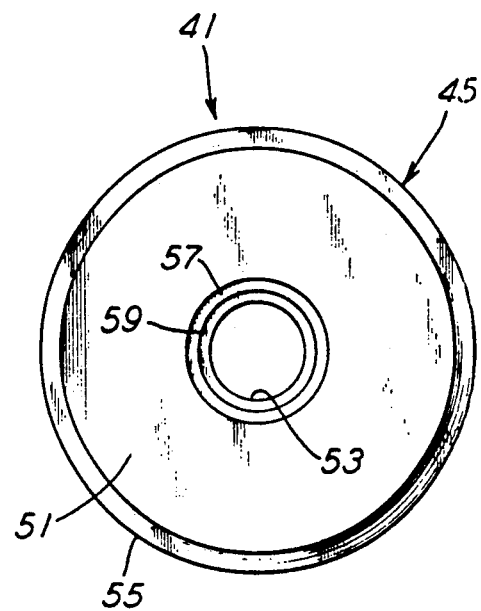
FIG. 8 is a top plan view of a seal of the present invention.
Figure 7:
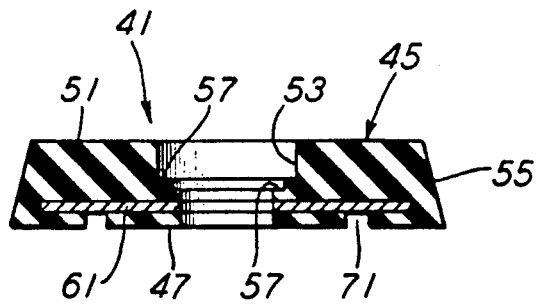
FIG. 7 is a cross-sectional view taken along lines VII—VII of FIG. 6.
Figure 9:
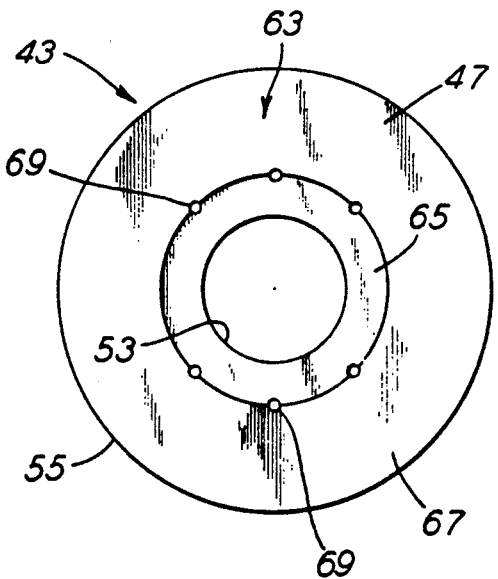
FIG. 9 is a bottom plan view of a prior art seal.

A seal 41 according to the present invention is shown in FIGS. 6 to 8 as compared with a prior art seal 43, shown in FIG. 9. The present seal 41 and prior art seal 43 are comparable to each other in design, except for the surface of the base of the seals and are shown with like parts numbered alike. Seal 41 is formed as a circular rubber ring having a circular body portion 45, the body portion having a base 47 with a support surface 49, a top wall 51 and inner and outer walls 53, 55 respectively. The inner wall 53 is stepped so as to provide two shoulders, upper shoulder 57 and lower shoulder 59 between the top wall 51 and base 47, while the outer wall 55 is tapered outwardly at an acute angle from the top wall 51 to the base 47. The body portion 45 of the circular rubber ring seal 41 contains a circular metallic insert 61 embedded therein between the base 47 and the lower shoulder 59 on the inner wall 53. The prior art seal 43 had a construction the same as that of seal 41, except that the base 47 was of a distinct construction. In the prior art seal 43 (FIG. 9), which was formed by a compression molding technique, as hereinbefore described, the base 47 had a support surface 63 which was not planer but rather had a raised section 65 adjacent the inner wall 53, as well as a flat section 67 between the raised section 65 and the outer wall 55. With the use of support pins for support of the metallic insert during compression molding Of sea 43, a series of small circular indentations 69 were formed in the base 47.

In the present seal 41, as best seen in FIG. 6, the base 47 has a flat planer surface 49 with a plurality of spaced aligned accurate grooves 71 formed therein, which grooves 71 extend inwardly towards the metallic insert. Preferably, at least four of said grooves are provided equidistantly spaced about said bases.

A particularly useful seal of the Present invention is one for use in a railway brake mechanism, the seal formed as a rubber body composed of an oil resistant rubber composite having a Durometer hardness of about 80, and being at least 90 percent cured. The body has a thickness of about 0.176 inch, an outer diameter at the base 47 of about 1.093 inch and an outer diameter of the at the top wall 51 of about 1.067 inch. The inner diameter of the ring seal at the top wall 51 is about 0.812 inch, at the first Shoulder 57 of about 0.734 inch (about 0.056 inch from and at the second shoulder 59 (0.083 inch from top wall 51) and the base 47 of about 0.715 inch. The surface 49 of the base 47 Would have four spaced arcuate grooves 71 substantially equidistant about the base 47, between the inner wall 53 and outer wall 55, the grooves 7 being about 0.047 inch wide and about 0.30 inch deep, with a spacing of about 0.12 inch between adjacent grooves 71.

The present seal 41 has planar surfaces 51 as a top wall and 49 as the surface of the base, with the metallic insert 61 embedded therein with the metallic insert 61 retained in a coplanar relationship with the surface 51 and 49 of the seal 41. Such a coplanar relationship provides a seal 41 which does not require smoothing or lapping of either of the surfaces 51 and 49, prior to use and consistently provides a good seal between components for which the ring seal 41 is used. The metallic insert is in the form of a flat ring and is preferably formed from brass.

Figure 10:
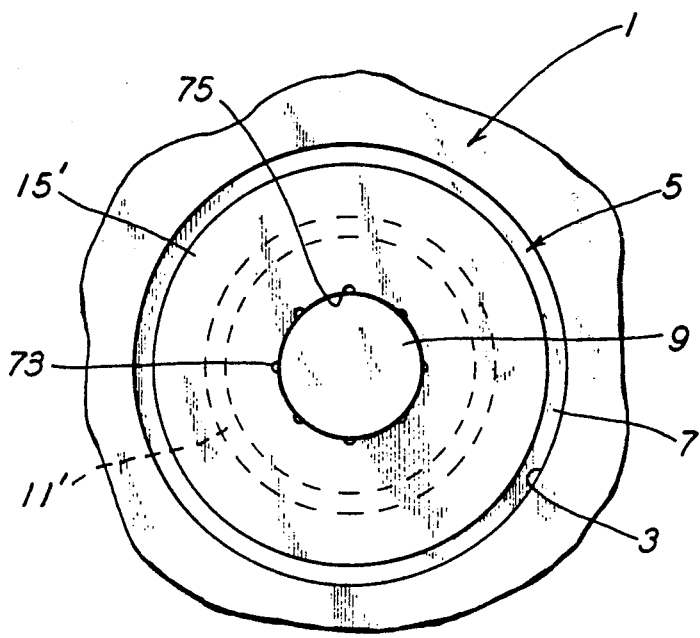
FIG. 10 is a plan view of a transfer mold cavity used in another embodiment of the present method with a metallic insert in place.
Figure 11:
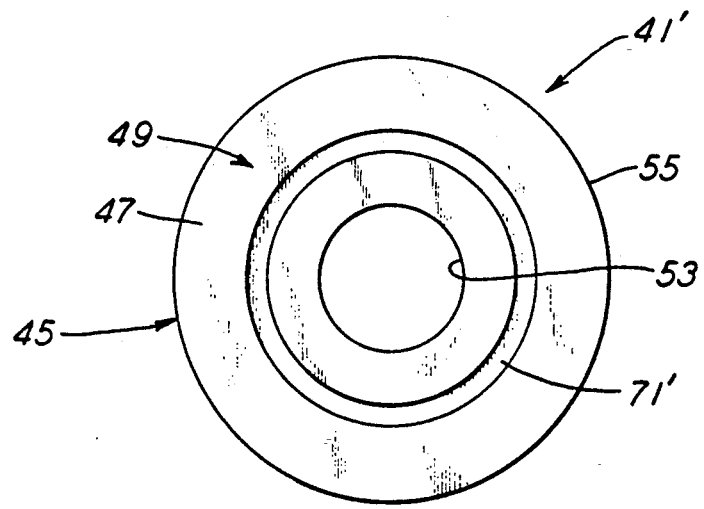
FIG. 11 is a bottom plan view of another embodiment of a seal of the present invention.

Referring now to FIGS. 10 and 11, another embodiment of the present method and seal are illustrated, wherein like components to those of FIGS. 1-9 are identified with like numerals. In FIG. 10, a mold cavity 1 is illustrated prior to transfer of a flowable rubber composition to the mold cavity where an arcuate boss 11', shown in dashed lines, extends as a complete boss about a circle concentric with the post 9. The metallic insert 15', as shown has a plurality of slots 73 therein along the inner edge 75 thereof facing the post 9, such that flowable rubber composition can flow between the post 9 and the metallic insert 15' through the slots 73 outwardly to the arcuate boss 11', while further flowable rubber composition can flow between the outer edge 77 of the metallic insert 15' and the wall 3 of the mold cavity 1 inwardly to the arcuate boss 11'. The remainder of the method is carried out as previously described to produce a seal 41'. As shown in FIG. 11, the seal 411 is identical to that of seal 41, except that a single arcuate groove 71' is formed in the base 47 which extends inwardly toward the metallic insert.

In both seals 41 and 41', the metallic insert is retained in a coplanar relationship with the surface 51 and 49 of the seal.

What is claimed is:

1. A rubber seal containing a metallic insert, said rubber seal comprising:
    (a) a rubber ring including a body portion having a base, said base having a flat planar support surface, a substantially flat and uninterrupted top wall, an inner wall and an outer wall;
    (b) a metallic insert embedded in said body portion in a plane parallel to said top wall and said flat planar support surface; and
    (c) at least four spaced aligned arcuate grooves provided in said flat planar support surface of said base of said body member extending inwardly towards said metallic insert.

2. The rubber seal containing a metallic insert, as defined in claim 1, wherein said inner wall is stepped so as to provide two shoulders between said top wall and said base.

3. The rubber seal containing a metallic insert, as defined in claim 1, wherein said outer wall is tapered outwardly at an acute angle from said top wall to said base.

4. The rubber seal containing a metallic insert, as defined in claim 1, wherein said metallic insert is composed of brass.

5. A rubber seal containing a metallic insert, said rubber seal comprising:
    (a) a rubber ring including a body portion having a base, said base having a flat planar support surface, a top wall, an inner wall and an outer wall;
    (b) a metallic insert embedded in said body portion; and
    (c) at least four spaced aligned arcuate grooves formed in said flat planar support surface of said base of said body member extending inwardly toward said metallic insert.

6. The rubber seal containing a metallic insert, as defined in claim 5, wherein said metallic insert is embedded therein in a plane parallel to said top wall and said flat planar support surface.

7. The rubber seal containing a metallic insert, as defined in claim 5, wherein said inner wall is stepped so as to provide two shoulders between said top wall and said base.

8. The rubber seal containing a metallic insert, as defined in claim 5, wherein said outer wall is tapered outwardly at an acute angle from said top wall to said base.

9. The rubber seal containing a metallic insert, as defined in claim 5, wherein said metallic insert is composed of brass.

* * * * *

UNITED STATES PATENT AND TRADEMARK OFFICE
CERTIFICATE OF CORRECTION

PATENT NO. : 5,303,937
DATED      : Apr. 19, 1994
INVENTOR(S) : Howard D. Huss

It is certified that error appears in the above-indentified patent and that said Letters Patent is hereby corrected as shown below:

```
Column 2, line 14, delete "the-post" and insert --the post--
Column 4, line 45, delete "Of sea" and insert --of seal--;
column 4, line 53, delete "Present" and insert --present--;
column 4, line 62, delete "Shoulder" and insert --shoulder--;
column 4, line 63, insert --top wall 51)-- before and;
column 4, line 65, delete "Would" and insert --would--;
column 4, line 68, delete "7" and insert --71--.
Column 5, line 32, delete "411" and insert --41'--.
```

Signed and Sealed this

Twenty-sixth Day of July, 1994

Attest:

BRUCE LEHMAN

*Attesting Officer*       *Commissioner of Patents and Trademarks*